US008336096B2

(12) United States Patent
Narusawa et al.

(10) Patent No.: US 8,336,096 B2
(45) Date of Patent: Dec. 18, 2012

(54) ACCESS CONTROL APPARATUS, IMAGE DISPLAY APPARATUS, AND PROGRAM THEREOF

(75) Inventors: Atsushi Narusawa, Tokyo (JP);
Yasuhito Nagatomo, Shioziri (JP);
Masanori Morita, Tokyo (JP);
Nobutake Ishii, Tokyo (JP); Mamoru Sakai, Kawasaki (JP)

(73) Assignee: Seiko Epson Corporation, Tokyo (JP)

( * ) Notice: Subject to any disclaimer, the term of this patent is extended or adjusted under 35 U.S.C. 154(b) by 1087 days.

(21) Appl. No.: 11/835,879

(22) Filed: Aug. 8, 2007

(65) Prior Publication Data

US 2008/0052778 A1    Feb. 28, 2008

(30) Foreign Application Priority Data

Aug. 25, 2006    (JP) ................................. 2006-229481

(51) Int. Cl.
*G06F 7/04*    (2006.01)

(52) U.S. Cl. ................ 726/19; 726/5; 726/29; 380/159; 380/161; 370/252; 370/253

(58) Field of Classification Search ............. 726/17–20, 726/28; 713/178, 169; 370/252
See application file for complete search history.

(56) References Cited

U.S. PATENT DOCUMENTS

| | | | |
|---|---|---|---|
| 7,027,408 B2 * | 4/2006 | Nabkel et al. ................. | 370/252 |
| 7,100,203 B1 * | 8/2006 | Tosey .............................. | 726/17 |
| 7,114,178 B2 * | 9/2006 | Dent et al. ....................... | 726/6 |
| 7,278,024 B2 * | 10/2007 | Sundararajan et al. ........ | 713/183 |
| 7,337,466 B2 * | 2/2008 | Light et al. ...................... | 726/2 |
| 7,363,494 B2 * | 4/2008 | Brainard et al. ................ | 713/168 |
| 7,434,063 B2 * | 10/2008 | Watanabe ....................... | 713/186 |
| 7,434,252 B2 * | 10/2008 | Ballinger et al. ................ | 726/10 |
| 7,568,098 B2 * | 7/2009 | Yeates et al. .................... | 713/171 |
| 7,606,560 B2 * | 10/2009 | Labrou et al. ................... | 455/411 |
| 7,712,131 B1 * | 5/2010 | Lethe .............................. | 726/20 |

(Continued)

FOREIGN PATENT DOCUMENTS

JP    A-2002-163235    6/2002

(Continued)

OTHER PUBLICATIONS

Claudio Ardagna, Supporting Location Based Conditions in Access Control Policies, Feb. 2006, ACM, ASIAACCS 2006, pp. 217-220.*

*Primary Examiner* — Nathan Flynn
*Assistant Examiner* — Viral Lakhia
(74) *Attorney, Agent, or Firm* — Oliff & Berridge, PLC (57) ABSTRACT

An access control apparatus including a memory section that stores information; an authentication information memory section that stores at least first stored user authentication information and second stored user authentication information corresponding to a user; an input section in which first inputted user authentication information and second inputted user authentication information are inputted; a judgment section that judges whether the first inputted user authentication information matches the first stored user authentication information; a registration section that stores a second inputted authentication information in the authentication information memory section, if the judgment sections judges that the first inputted authentication information matches the first stored user authentication information; and an approval section that approves access to the information stored in the memory section for a predetermined time period if the judgment section judges that: (1) the first inputted authentication information matches the first stored user authentication information, and (2) the second inputted authentication information matches the second stored authentication information.

10 Claims, 4 Drawing Sheets

U.S. PATENT DOCUMENTS

| | | | |
|---|---|---|---|
| 7,748,047 B2* | 6/2010 | O'Neill | 726/29 |
| 7,913,084 B2* | 3/2011 | Medvinsky et al. | 713/168 |
| 8,010,805 B2* | 8/2011 | Gervais et al. | 713/193 |
| 8,060,933 B2* | 11/2011 | Fang | 726/22 |
| 2002/0099951 A1* | 7/2002 | O'Connor | 713/200 |
| 2003/0051147 A1* | 3/2003 | Maeda et al. | 713/186 |
| 2004/0054935 A1* | 3/2004 | Holvey et al. | 713/202 |
| 2005/0050367 A1* | 3/2005 | Burger et al. | 713/202 |
| 2005/0091338 A1* | 4/2005 | de la Huerga | 709/217 |
| 2005/0166263 A1* | 7/2005 | Nanopoulos et al. | 726/7 |
| 2005/0188226 A1* | 8/2005 | Kasatani | 713/201 |
| 2006/0190991 A1* | 8/2006 | Iyer | 726/3 |
| 2007/0136814 A1* | 6/2007 | Lee et al. | 726/25 |

FOREIGN PATENT DOCUMENTS

| | | |
|---|---|---|
| JP | A 2002-222168 | 8/2002 |
| JP | A-2002-328907 | 11/2002 |
| JP | A-2004-151938 | 5/2004 |
| JP | A-2004-237842 | 8/2004 |
| JP | A 2006-4007 | 1/2006 |

\* cited by examiner

| USER ID | INTRODUCER USER ID | FINGERPRINT DATA STORAGE ADDRESS | REGISTRATION TIME AND DATE | EXPIRATION TIME AND DATE |
|---|---|---|---|---|
| UID001 | — | add1000100 | 2005/1/30/10:00 | — |
| UID002 | UID001 | add1000200 | 2006/9/30/10:00 | 2006/10/1/10:00 |
| UID003 | — | add1000300 | 2006/5/30/14:00 | — |
| ... | ... | ... | ... | ... |
| ... | ... | ... | ... | ... |

| USER ID | FILE NAME |
|---|---|
| UID001 | "A" FILE - "E" FILE |
| UID002 | "A" FILE |
| UID003 | "A" FILE - "K" FILE |
| ... | ... |
| ... | ... |

GUEST USER REGISTRATION WINDOW

PLEASE DESIGNATE THE LENGTH OF THE ACCESS VALID TIME PERIOD.

rb1 ● ONE DAY (DEFAULT)
rb2 ○ [ ] HOUR(S)

PLEASE DESIGNATE THE RANGE OF ACCESS APPROVAL.

rb3 ● CURRENTLY DISPLAYED FILE ONLY (DEFAULT)
rb4 ○ FILE NAME(S) [ ]

REGISTRATION

ACCESS CONTROL APPARATUS, IMAGE DISPLAY APPARATUS, AND PROGRAM THEREOF

CROSS-REFERENCE TO RELATED APPLICATION

This application claims priority from Japanese Patent Application No. 2006-229481 filed in the Japanese Patent Office on Aug. 25, 2006, the entire disclosure of which is hereby incorporated by reference in its entirety.

BACKGROUND

1. Technical Field

Exemplary embodiments of the present invention relate to a technique for controlling access to information.

2. Related Art

When users attempt to access information that is stored in a computer, generally, the following procedures are implemented so as to prevent any unintended leakage of the information to any unauthorized third party. First of all, the user inputs an identifier that is dedicatedly assigned to him/her (e.g. a user ID) and information that he or she knows exclusively (e.g. a password) as authentication information to the computer. Then, the computer collates the inputted authentication information with a pre-registered one so as to verify the authenticity of the user. Next, referring to a list called as Access Control List (ACL), the computer judges as to whether an access right on the information that is currently being accessed by the user has been given to the user. If it is judged that the access right has been given to the user, the computer approves access to the information. An information leakage prevention technique as described above has rapidly been advancing. Recently, as an example of such growing art, a technique for verifying user authenticity by means of biological information such as fingerprint data has been proposed as disclosed in JP-A-2006-004007.

In some instances, there are certain needs to provide an unregistered user whose authentication information has not been registered in advance or who has not been given an access right with a temporary authority for accessing information. Among various situations where such a temporary access authority is needed is, for example, sharing of information between participants of a conference, meeting, and so forth, where one user allows another user to have access to information that is useful for discussion on a temporary basis so that the discussion goes smoothly, or mutual understanding between the participants on a topic is deepened. A user who is given a temporary access as described above is referred to, as an example denomination, as "guest user." In such a related art, a guest user is allowed to have an information access authority by, for example, using a predefined user ID provided for guest users (hereafter referred to as guest ID) or using new authentication information that is temporarily registered by a system administrator.

However, according to the above-described approaches, there are problems as described below.

For example, if a guest ID is adopted, it is not impossible for a certain user who has used a guest ID once to access information thereafter by means of the same guest ID as previously allowed one, which poses a risk of unauthorized leakage of information. On the other hand, if it is chosen to register new authentication information temporarily, a system administrator has to perform burdensome tasks of registering new authentication information and setting an access right thereon. Since persons in charge of system administration jobs are limited to a very small number of users, it is often impossible for a system administrator to deal with such a registration task on a timely basis in cases where immediate registration of guest user authentication information is required. In addition, a deletion task of the temporarily registered authentication information is unavoidable because the same problem as that occurs when using the above guest ID holds true unless it is deleted after use. Not so infrequently, such a deletion is neglected because it is bothersome.

SUMMARY

Some embodiments provide a scheme for allowing temporary access to information while effectively preventing the information from being leaked, which is achieved with less burden of task than that born in prior art.

In order to achieve the above object among other objects addressed by exemplary embodiments of the invention, embodiments of the invention can include an access control apparatus that includes: a memory section in which information is stored; an authentication information memory section in which at least a first authentication information corresponding to each user is stored; an input section in which authentication information is inputted; a judgment section that judges as to whether the authentication information inputted into the input section agrees with the first authentication information stored in the authentication information memory section or not; a registration section that causes a second authentication information inputted into the input section during a predetermined time period to be stored by the authentication information memory section, the predetermined time period being before or after a point in time at which the authentication information is inputted, if it is judged that the authentication information inputted into the input section agrees with the first authentication information stored in the authentication information memory section; and an approval section that approves access to the information stored in the memory section if it is judged that the authentication information inputted into the input section agrees with the first authentication information stored in the authentication information memory section, and approves access to the information stored in the memory section only during a given access valid time period if it is judged that the authentication information inputted into the input section agrees with the second authentication information stored in the authentication information memory section. According to an exemplary embodiment, it is possible to provide a scheme for allowing temporary access to information while effectively preventing the information from being leaked. In addition, according to an exemplary embodiment, the burden of work imposed on users will be reduced in comparison with a case where the configuration of an exemplary embodiment invention is not provided.

In an exemplary embodiment, it is preferable that the access control apparatus further includes an access range memory section in which a range of information accessible by a user corresponding to the first authentication information is stored, wherein the registration section causes the second authentication information to be stored in the authentication information memory section in association with the first authentication information if it is judged that the authentication information inputted into the input section agrees with the first authentication information stored in the authentication information memory section, and the approval section approves access to the same range, or narrower, of information as that is accessible by the user corresponding to the first authentication information with which the second authentication information is associated if it is judged that the authentication information inputted into the input section agrees with the second authentication information. By this means, it is possible to set the range of information that is accessible by the user corresponding to the second authentication information to be the same as the range of information that is accessible by the user corresponding to the first authentication information, or narrower than that.

In an exemplary embodiment of the invention, it is preferable that the access control apparatus includes a designation section that designates a range of information that is accessible by a user corresponding to the first authentication information, wherein the registration section causes the second authentication information to be stored in the authentication information memory section in association with the first authentication information if it is judged that the authentication information inputted into the input section agrees with the first authentication information stored in the authentication information memory section, and the approval section approves access to information within a range designated by the user corresponding to the first authentication information with which the second authentication information is associated if it is judged that the authentication information inputted into the input section agrees with the second authentication information. By this means, it is possible to set the accessible range of the user corresponding to the second authentication information to be a range designated by the user corresponding to the first authentication information.

In an exemplary embodiment, it is preferable that the registration section causes each of a plurality of authentication information to be stored in the authentication information memory section as the second authentication information if the plurality of the authentication information is inputted into the input section during a predetermined time period before or after a point in time at which authentication information agreeing with the first authentication information is inputted. By this means, it is possible to grant an access authority to the plurality of the users corresponding to the plurality of the second authentication information.

In an exemplary embodiment, it is preferable that the registration section causes authentication information, which is inputted into the input section during a predetermined time period before or after a point in time at which authentication information is inputted, to be stored in the authentication information memory section as the third authentication information if it is judged that the authentication information inputted into the input section agrees with the second authentication information stored in the authentication information memory section, and an approval section approves access to the information stored in the memory section only during the access valid time period if it is judged that the authentication information inputted into the input section agrees with the third authentication information stored in the authentication information memory section. By this means, it is possible for the user corresponding to the second authentication information to grant another user (user corresponding to the third authentication information) an authority to access information.

In an exemplary embodiment, it is preferable that the approval section has a history memory section that memorizes identification information of the user requesting access and access-approved information in association with each other when the approval section approves access to the information. With such an access history, it is possible to trace the route of unauthorized leakage of a document based on the memory content of the history memory section when, for example, any unauthorized leakage of information occurs. In addition, the existence of such a trace scheme acts as a deterrent against any unauthorized leakage of information.

An exemplary embodiment may also provide an image display apparatus that is provided with the access control apparatus according to the first aspect and a display section that displays, as an image, the information that is approved for access by the approval section of the access control apparatus. According to an exemplary embodiment, it is possible to provide a scheme for allowing temporary display of information while effectively preventing the information from being leaked. In addition, according to an exemplary embodiment, the burden of work imposed on users will be reduced in comparison with a case where the configuration of an exemplary embodiment is not provided.

Some exemplary embodiments provide a program for directing a computer to implement functions, where the computer has a memory section in which information is stored, an authentication information memory section in which at least a first authentication information corresponding to each user is stored, and an input section in which authentication information is inputted. The program directing the computer to implement functions according to some exemplary embodiments includes: a judgment function of judging as to whether the authentication information inputted into the input section agrees with the first authentication information stored in the authentication information memory section or not; a registration function of causing a second authentication information inputted into the input section during a predetermined time period to be stored by the authentication information memory section, the predetermined time period being before or after a point in time at which the authentication information is inputted, if it is judged that the authentication information inputted into the input section agrees with the first authentication information stored in the authentication information memory section; and an approval function of approving access to the information stored in the memory section if it is judged that the authentication information inputted into the input section agrees with the first authentication information stored in the authentication information memory section, and approving access to the information stored in the memory section only during a given access valid time period if it is judged that the authentication information inputted into the input section agrees with the second authentication information stored in the authentication information memory section. According to an exemplary embodiment, it is possible to provide a scheme for allowing temporary access to information while effectively preventing the information from being leaked. In addition, according to an exemplary embodiment, the burden of work imposed on users will be reduced in comparison with a case where the configuration of an exemplary embodiment of the invention is not provided.

BRIEF DESCRIPTION OF THE DRAWINGS

Exemplary embodiments of the invention will be described with reference to the accompanying drawings, wherein like numbers reference like elements.

DESCRIPTION OF EXEMPLARY EMBODIMENTS

In the following description, best mode of the invention is explained while exemplifying an image display apparatus called as "electronic paper." The electronic paper is an image display apparatus dedicated to provide an image display function, where it utilizes a display medium having a memory property such as cholesteric liquid crystal.

Some image display apparatuses of this type have a fingerprint authentication device as their authentication means. As a person who attempts to manipulate an image display apparatus is required to prove his/her user-authenticity prior to manipulation, the user allows his/her fingerprint data (authentication information) to be scanned by a finger print authentication device of the image display apparatus. Then, if the scanned information agrees with a pre-registered one, the manipulation on the image display apparatus by the authenticated user is approved.

Herein, an act of registering fingerprint data in the image display apparatus is allowed only in a condition where the image display apparatus is connected with a host apparatus via a communication line such as Universal Serial Bus (USB) cable. This restriction is for the purpose of maintaining a certain security level. Therefore, if the image display apparatus is lent out to a guest user, a plurality of procedures must be gone through, including but not limited to, the connecting of the host apparatus and the image display apparatus via the communication line, the registration of the guest user authentication information (fingerprint data) in the image display apparatus, and so on. In addition, as have already been described, it is necessary to delete the registered authentication information after the use of the image display apparatus by the guest user, which is another bothersome task. That is, in the image display apparatus called as electronic paper, very burdensome tasks are required so as to allow the guest user to use the image display apparatus temporarily.

The details of exemplary embodiments of the invention are described below.

(1) Configuration

Figure 1:
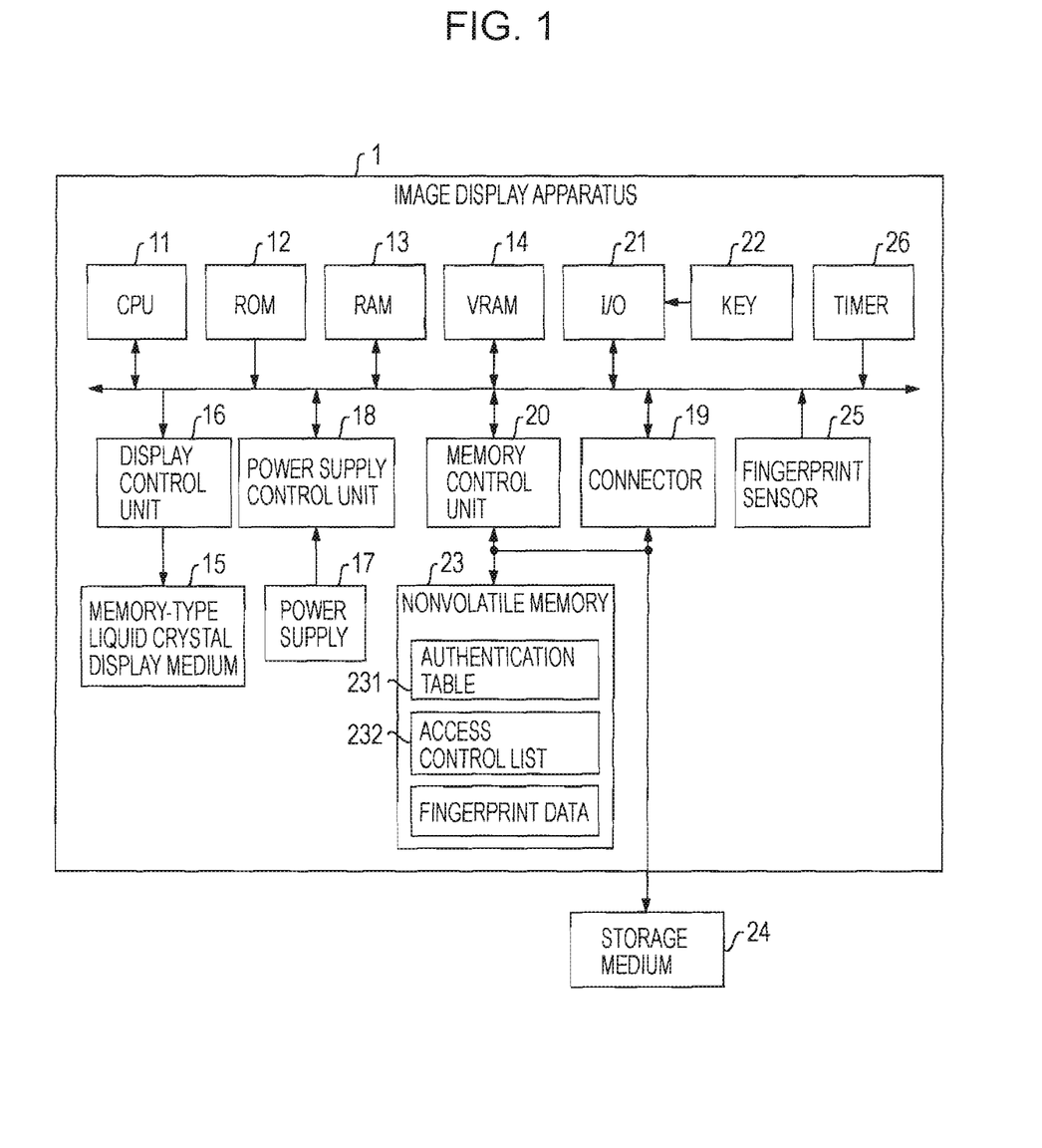
FIG. 1 is a block diagram that schematically illustrates an example of an image display apparatus according to an embodiment of the invention.

FIG. 1 is a block diagram that schematically illustrates an example of a hardware configuration of an image display apparatus 1 according to an exemplary embodiment of the invention.

The image display apparatus 1 is provided with a Central Processing Unit (CPU) 11, Read Only Memory (ROM) 12, Random Access Memory (RAM) 13, Video Random Access Memory (VRAM) 14, a memory-type liquid crystal display medium 15, a display control unit 16, a power supply 17, a power supply control unit 18, a connector 19, a memory control unit 20, an I/O 21, a key 22, a nonvolatile memory 23, a fingerprint sensor 25, and a timer 26. The CPU 11, ROM 12, RAM 13, the nonvolatile memory 23, the fingerprint sensor 25, and the timer 26 functions as an access control apparatus as a whole that performs access control on information stored in the image display apparatus 1.

The CPU 11 reads out a control program stored in the ROM 12 to extract the read-out control program in the RAM 13, and performs processing in accordance with the procedures scripted in the control program. The fingerprint sensor 25 is, for example, a photo sensor device. The fingerprint sensor 25 generates fingerprint data by scanning the fingerprint of users. The fingerprint sensor 25 functions as input means for inputting fingerprint data into the image display apparatus 1 as user authentication information.

A portable storage medium 24 such as a removable medium can be detachably attached to the connector 19. In some embodiments, the storage medium 24 may be configured as a card-type storage medium having a built-in flash memory such as a Secure Digital (SD) card, or as a disk-type storage medium that utilizes magnetic medium such as a floppy disk®. A plurality of content data for displaying various content on the image display apparatus 1 is stored in the storage medium 24 and/or the nonvolatile memory 23. In this embodiment, "documents" consisting of a plurality of pages are assumed to constitute content.

When the memory control unit 20 reads content data out of the storage medium 24 attached to the connector 19, or the nonvolatile memory 23, the CPU 11 converts the read-out content data into an image data such as bitmap format data, and writes the converted data into the VRAM 14. The memory-type liquid crystal display medium 15 is display means that utilizes cholesteric liquid crystal, electrophoresis, and so on. The memory-type liquid crystal display medium 15 has a memory property that enables image display to be continued even when power supply is stopped. Image data written into the VRAM 14 is supplied to the display control unit 16 under the instructions of the CPU 11. The display control unit 16 controls the memory-type liquid crystal display medium 15 so that an image is displayed based on the above image data. The key 22 is manipulation means to be operated by users. In some embodiments, the key 22 may include a manipulation device such as pen-type device or joystick. The I/O 21 monitors the manipulation state of the key 22; and when user manipulates the key 22, the I/O 21 supplies a signal in accordance with the manipulation to the CPU 11. The power supply 17 is, for example, a rechargeable battery. The power supply control unit 18 is responsible for various kinds of battery control such as the ON/OFF control of the power supply 17, and the monitoring of the remaining battery amount thereof.

The nonvolatile memory 23 is nonvolatile memory means such as Electrically Erasable and Programmable Read Only Memory (EEPROM) or flash memory. An authentication table 231, an Access Control List (ACL) 232, and fingerprint data are stored in the nonvolatile memory 23. The authentication table 231, the Access Control List (ACL) 232, and the fingerprint data are used when the CPU 11 judges as to whether it responds to an access request from user or not. Timer 26 is a time counter, which is used for example when CPU 11 judges as to whether, upon receiving an access request from user, the attempted access can be done within a valid time period or not.

Figure 2:
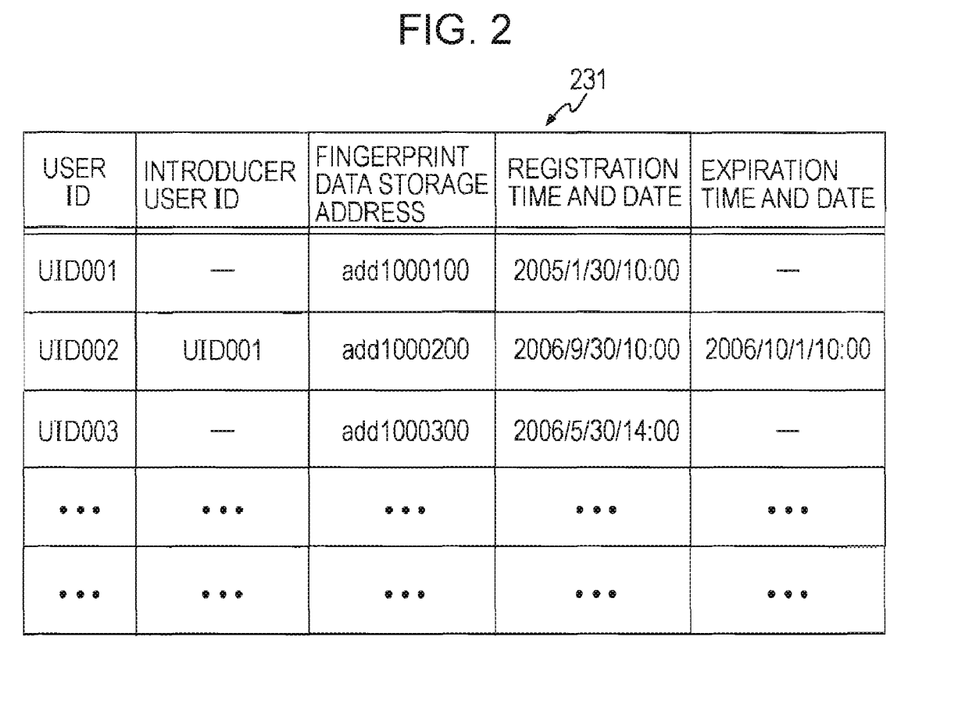
FIG. 2 is a table illustrating an example of an authentication table stored in the image display apparatus according to an embodiment of the invention.

FIG. 2 is a table illustrating an example of content of the authentication table 231.

As shown in FIG. 2, in the authentication table 231, each record of "user ID", "introducer user ID", "fingerprint data storage address", "registration time and date", and "expiration time and date" is associated with other corresponding record. Among these records, the "user ID" is an identifier dedicatedly assigned to each user. Among all users each of which a user ID is dedicatedly assigned to, the "introducer user ID" denotes the user TD of a main user who gives a temporary access authority to a guest user(s). More specifically, in the authentication table 231, the users to which the "user ID" only is assigned are main users, whereas the user to which both the "user ID" and the "introducer user ID" are assigned is a guest user. For example, in FIG. 2, the user having the user ID "UID001" is a main user because there is no introducer user ID corresponding thereto. On the other hand, the user having the user ID "UID002" is a guest user who is given a temporary access authority by the user having the user ID "UID001" because there is an introducer user ID corresponding thereto, that is, the introducer user ID "UID001."

The "fingerprint data storage address" indicates a memory address inside the nonvolatile memory 23 at which the fingerprint data (authentication information) of each user is stored. The fingerprint data has originally been scanned by the fingerprint sensor 25 and then stored into the nonvolatile memory 23. The CPU 11 collates fingerprint data stored in the nonvolatile memory 23 and fingerprint data scanned by the fingerprint sensor 25 at the time of user authentication. Then, if the CPU 11 finds a fingerprint data matching with the fingerprint data scanned by the fingerprint sensor 25 among the group of the fingerprint data pre-stored in the nonvolatile memory 23, it judges that the authentication target user is a duly authorized one, whereas it judges that the authentication target user is not a duly authorized one if there is no matching fingerprint data in the group of the fingerprint data pre-stored in the nonvolatile memory 23. The "registration time and date" indicates time and date at which a new user fingerprint data is stored into the nonvolatile memory 23, and a user ID is assigned to the new user, regardless of whether the new user is a main user or a guest user.

As mentioned earlier, a main user is a user who is allowed to access a document(s) without any limitation of access time period, while a guest user is a user who is given a temporary access authority. For this reason, the "expiration time and date" for an approved access right is written in the table in association with the user ID of the guest user. The "expiration time and date" is designated by the main user who gives an access authority to the guest user(s) at the time of registration of guest user information in the authentication table 231. The guest user is allowed to access the document(s) only during an access valid time period from the "registration time and date" to the "expiration time and date." According to an example shown in FIG. 2, the guest user having the user ID "UID002" is allowed to have access only during an access valid time period from the Sep. 30, 2006, 10:00, which is the registration time and date, to Oct. 1, 2006, 10:00, the expiration time and date. After the expiration of the access valid time period specified in the authentication table 231, the CPU 11 deletes all records in the authentication table 231 pertaining to the guest user whose access valid time period has expired. Notwithstanding the above, because the CPU 11 judges as to whether access should be approved or not based on the set expiration time and date, there is a very low possibility that any actual damage such as unauthorized access occurs even when the records of the access-expired guest user are not deleted from and remain in the authentication table 231.

As described above, the fingerprint data stored in the "fingerprint data storage address" includes two types thereof, that is, the fingerprint data of the main user (a first authentication information) and the fingerprint data of the guest user (a second authentication information). The fingerprint data of the main user (the first authentication information) does not have the introducer user ID corresponding thereto, whereas the fingerprint data of the guest user (the second authentication information) has the introducer user ID corresponding thereto. Therefore, it is possible to differentiate one from the other based on the presence/absence of the introducer user ID.

Figure 3:
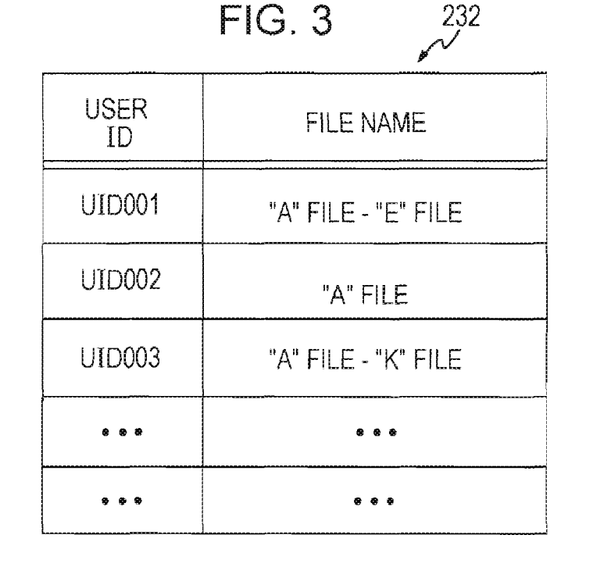
FIG. 3 is a table illustrating an example of an access control list stored in the image display apparatus according to an embodiment of the invention.

FIG. 3 illustrates an example of content in the Access Control List 232.

In the Access Control List 232, the accessible range of access target objects is written for each individual user in association with the corresponding user ID thereof. Herein, the accessible range thereof is represented by enumerating the identification information of accessible document(s) (herein, the file name(s) of document(s)). By referring to the content of the Access Control List, the CPU 11 judges as to whether a request for accessing a specific document should be approved or not. According to an example illustrated in FIG. 3, the user having the user ID "UID001" (main user) is allowed to access the documents having the file names of "A file"-"E file", but not allowed to access any other documents.

The main user may give the guest user(s) the same access authority as his/her own; or in other words, the main user may allow the guest user(s) to access all of the documents that are accessible by the main user himself/herself. Alternatively, the main user may give the guest user(s) an authority to access only a part of all contents that are accessible by the main user himself/herself. In either case of access grant described above, the range accessible to the guest user(s) does not exceed the range accessible to the main user; that is, the range accessible to the guest user(s) is either the same as or narrower than the accessible range of the main user. FIG. 3 illustrates an example in which the guest user having the user ID "UID002" is allowed to access the "A file" only among the "A file"-"E file" all of which are accessible by the main user having the user ID "UID001." The accessible range of the guest user(s) is designated by the main user who gives an access authority to the guest user(s) at the time of registration of guest user information in the authentication table 231.

An exemplary embodiment is as described above.

(2) Operation

Next, with reference to a flowchart illustrated in FIG. 4, the operation of an exemplary embodiment of the invention is described below.

First of all, an explanation is given on the operation conducted when the main user instructs the image display apparatus 1 to display a desired access target document. In FIG. 4, upon detection of some manipulation on the key 22 (step S11: Yes), the CPU 11 determines what kind of processing is being instructed now through the key manipulation (step S12). If it is determined that the user requests for the display of a document having the file name "A-file" (step S12: document display), the CPU 11 directs the memory-type liquid crystal display medium 15 to display a message which prompts the user to press his/her finger against the fingerprint sensor 25, and further directs the fingerprint sensor 25 to scan the user fingerprint during a certain fingerprint read duration of time (step S13).

Next, the CPU 11 collates fingerprint data representing the scanned fingerprint with fingerprint data stored in the nonvolatile memory 23 (step S14). If any fingerprint data that agrees with the scanned fingerprint data is stored in the nonvolatile memory 23 (step S15: Yes), the CPU 11 executes a search through the authentication table 231 while using the address at which the fingerprint data is stored as a key for the search, thereby identifying the corresponding user ID ("UID001" in this example) (step S16). At this time, the CPU 11 compares the expiration time and date that corresponds to the identified user ID "UID001" with the current time and date that is counted by the timer 26, and confirms that the current time and date is not after the expiration time and date. In this example, because there is not any expiration time and date that corresponds to the identified user ID "UID001" (in other words, because the user having the user ID "UID001" is a main user), the CPU 11 judges that the requesting user is a duly authorized one.

Subsequently, the CPU 11 searches through the Access Control List 232 while using the access target file name "A-file" as a key for the search, and judges as to whether the user having the user ID "UID001" is allowed to access the document having this file name or not. In this example, as illustrated in FIG. 3, because the user having the user ID "UID001" is allowed to access the document having the file name "A-file" (step S17: Yes), the CPU 11 reads content data that represents this document out of the nonvolatile memory 23 or the storage medium 24 so as to direct the memory-type liquid crystal display medium 15 to display it (step S18).

It should be noted that, if it is found that any fingerprint data that agrees with the scanned fingerprint data is not stored in the nonvolatile memory 23 (step S115: No), or if it is determined that the user having the user ID "UID001" is not allowed to access the document having the file name "A-file" (step S17: No), the CPU 11 directs the memory-type liquid crystal display medium 15 to display a predetermined error message in each case (step S19), and then terminates processing.

Next, an explanation is given on the operation conducted when a main user (assumed to have a user ID "UID001") allows a guest user(s) to be registered.

Upon detection of some manipulation on the key 22 (step S11: Yes), the CPU 11 determines what kind of processing is being instructed now through the key manipulation (step S12). Herein, when the main user instructs for registration of a guest user(s), a guest user registration window as illustrated in FIG. 5 is displayed on the memory-type liquid crystal display medium 15. On this window, an access valid time period during which access is allowed, and a range of access approval are set. Although the default setting of the access valid time period is a length of one day (24 hours) counted from the time of registration, it is also possible for the main user to designate his/her desired length of period by the hour. Herein, it is assumed that a length of one day is set as access valid time period in accordance with the default setting. It should be noted that "rb1" and "rb2" indicate radio buttons, either one of which is selected by the user.

On the other hand, a range of access approval is set as follows.

First of all, if any document was displayed before the guest user registration window is displayed, the document is designated as access target as a default. Alternatively, it is also possible for the main user to designate a desired accessible range by enumerating the file names of documents in the file name field. Herein, it is assumed that the document having the file name of "A-file" was displayed before the guest user registration window is displayed; and it is further assumed that, in accordance with the default setting, this document is designated as one that is within the access approval range. It should be noted that "rb3" and "rb4" indicate radio buttons, either one of which is selected by the user.

When the soft button "registration" is selected on the guest user registration window, the CPU 11 recognizes the pressing of the "registration" button as manipulation instructing the registration of a guest user(s) (step S12: guest user registration). Then, the CPU 11 directs the memory-type liquid crystal display medium 15 to display a message that prompts the main user to press his/her finger against the fingerprint sensor 25, and further prompts the guest user(s) to press his/her finger against the fingerprint sensor 25 within a period of five seconds thereafter.

In response to the message, the main user presses his/her finger against the fingerprint sensor 25. The CPU 11 directs the fingerprint sensor 25 to scan this first fingerprint (step S20). Then, the CPU 11 collates fingerprint data of the scanned fingerprint with fingerprint data stored in the nonvolatile memory 23 (step S21), and directs the timer 26 to start clocking (step S22). Subsequently, the guest user(s) presses his/her finger against the fingerprint sensor 25. If the CPU 11 successfully scans the fingerprint (step S23: Yes) before timeout due to lapse of a predetermined length of time (e.g. five seconds) after the start of the timer (step S24: No), the scanned fingerprint data is stored into the nonvolatile memory 23, and the authentication table 231 is updated (step S25). That is, the CPU 11 assigns a new user ID (herein, "UID002") to the guest user, and adds new line of records to the authentication table 231 which the user ID "UID002" is filled in. Then, the CPU 11 fills the user ID "UID001" of the main user in the authentication table 231 as the introducer user ID. In addition thereto, the CPU 11 writes the fingerprint data storage address, the registration time and date, and the expiration time and date of the guest user(s) in the authentication table 231. As for the expiration time and date, it is possible to calculate it by adding the access valid time period designated on the guest user setting window to the above registration time and date.

Next, the CPU 11 updates the Access Control List 232 (step S26). That is, the CPU 11 adds new records to the Access Control List 232 and fills the user ID "UID002" therein. Then, the CPU 11 writes the file name of the document designated to fall within an access approval range on the guest user setting screen (in this example, "A-file") in the Access Control List 232. It should be noted that the CPU 11 directs the memory-type liquid crystal display medium 15 to display a predetermined error message (step S27) and then terminates processing if timeout occurs (step S24: Yes).

Next, an explanation is given on the operation conducted when the guest user (assumed to have the user ID "UID002") instructs the image display apparatus 1 to display the document having the file name "A-file."

Figure 4:
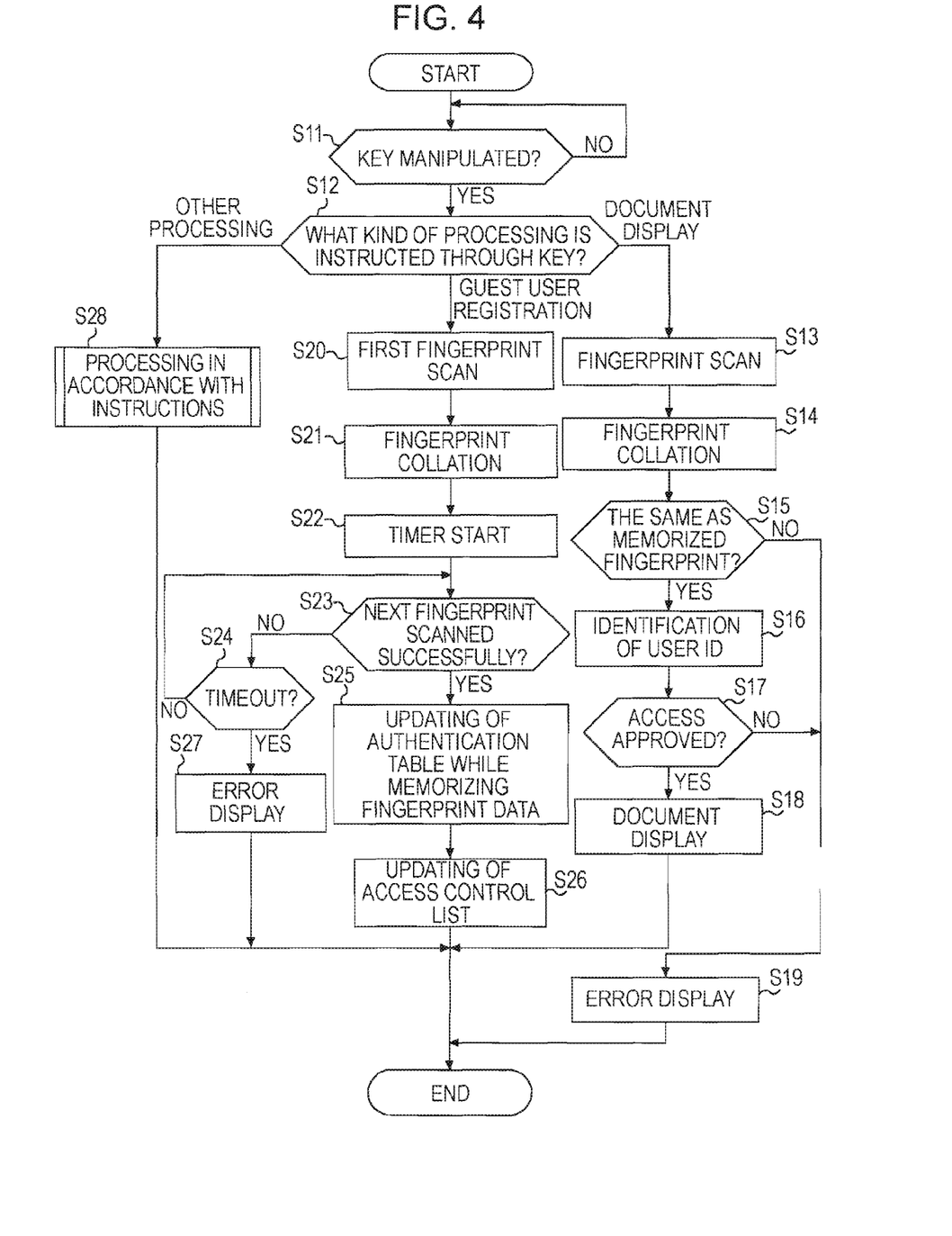
FIG. 4 is a flowchart illustrating an example of procedures executed by a CPU according to an embodiment of the invention.
Figure 5:
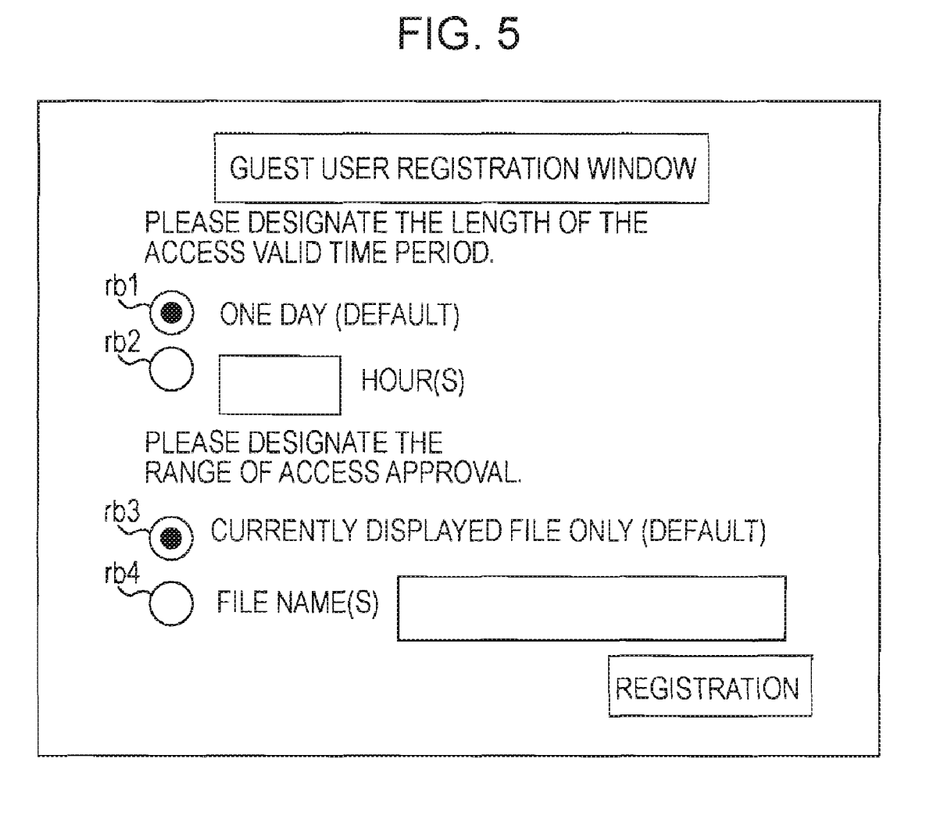
FIG. 5 is a diagram that schematically illustrates an example of a window image displayed in the image display apparatus according to an embodiment of the invention.

In FIG. 4, upon detection of some manipulation on the key 22 (step S11: Yes), the CPU 11 determines what kind of processing is being instructed now through the key manipulation (step S12). If it is determined that the user requests for the display of a document having the file name "A-file" (step S12: document display), the CPU 11 directs the memory-type liquid crystal display medium 15 to display a message which prompts the user to press his/her finger against the fingerprint sensor 25. In response to this message, the guest user presses his/her finger against the fingerprint sensor 25. Then, the CPU 11 directs the fingerprint sensor 25 to scan the fingerprint (step S13).

Next, the CPU 11 collates fingerprint data representing the scanned fingerprint with fingerprint data stored in the nonvolatile memory 23 (step S14). Herein, some fingerprint data that agrees with the scanned fingerprint data is supposed to be stored in the nonvolatile memory 23 (step S15: Yes), the CPU 11 executes a search through the authentication table 231 while using the address at which the fingerprint data is stored as a key for the search, thereby identifying the corresponding user ID ("UID002" in this example) (step S16). At this time, the CPU 11 compares the expiration time and date that corresponds to the identified user ID "UID002" with the current time and date that is counted by the timer 26, and confirms that the current time and date is not after the expiration time and date. Herein, it is assumed that the current time and date is not after the expiration time and date corresponding to the user having the user ID "UID002", that is, Oct. 1, 2006, 10:00. Thus, the CPU 11 judges that the requesting user having the user ID "UID002" is a duly authorized one.

Subsequently, the CPU 11 searches through the Access Control List 232 while using the access target file name "A-file" as a key for the search, and judges as to whether the user having the user ID "UID002" is allowed to access the document having this file name or not. In this example, as illustrated in FIG. 3, because the user having the user ID "UID002" is allowed to access the document having the file name "A-file" (step S17: Yes), the CPU 11 reads content data that represents this document out of the nonvolatile memory 23 or the storage medium 24 so as to direct the memory-type liquid crystal display medium 15 to display it (step S118).

It should be noted that, if it is found that any fingerprint data that agrees with the scanned fingerprint data is not stored in the nonvolatile memory 23 (step S15: No), or if it is determined that the user having the user ID "UID002" is not allowed to access the document having the file name "A-file" (step S17: No), the CPU 11 directs the memory-type liquid crystal display medium 15 to display a predetermined error message in each case (step S19), and then terminates processing.

In addition, in the step S12, if any processing other than document display and guest user registration described above is instructed through the manipulation (step S12: other processing), the CPU 11 performs processing in accordance with such an instruction (step S28).

According to an exemplary embodiment as described above, it is possible for a main user to give a guest user(s) a right to access document(s) while limiting the range of guest-user accessible document(s) within the range of main-user accessible document(s), and further limiting the guest-user's access valid time period. When such an access authority is granted, because the task of registration of the guest user authentication information (fingerprint data) is completed in a relatively short time period when each of the main user fingerprint and the guest user fingerprint is scanned, exemplary embodiments of invention reduce the burden of the registration task significantly compared with a conventional method where a system administrator is asked to perform the registration task. Needless to say, on the guest user registration window illustrated in FIG. 5, it is necessary to do some input work if the user desires to set any arbitrary user-specified access valid time period or access approval range. However, the burden on the main user will be significantly reduced if default setting is acceptable to him/her.

(3) Variations

The present invention is in no case limited to the specific embodiment or embodiments described above; and various modifications are conceivable as described below.

(3-1) Variation 1

According to the above-described exemplary embodiment, access control is implemented on each document, that is, on a "file-by-file" basis. Notwithstanding the above, the invention is not limited to such an embodiment. For example, an exemplary embodiment may be configured that a plurality of files are classified into several categories based on a predetermined property, and access approval/disapproval is judged on each category. If so configured, it is possible to approve/disapprove access to a group of files having a common property through one batch setting. In addition, access target information is not limited to documents; rather it includes all types of information such as a table, video, audio, etc.

(3-2) Variation 2

The number of the guest user(s) whom the main user can register is not limited to one. When registering a plurality of guest users, it may be configured that the plurality of the guest users are sequentially subjected to fingerprint scanning within a predetermined time period after the scanning of the fingerprint of the main user, and the scanned data are registered as the fingerprint data of these guest users (i.e. the second authentication information). Alternatively, it may be configured that one guest user is subjected to fingerprint scanning within a predetermined time period after the scanning of the fingerprint of the main user so as to register the scanned data as the fingerprint data of this guest user, and the same procedures are repeated as many times as the number of the guest users. In either configuration, it is possible to vary an access valid time period and an access approval range from one guest user to another.

As another variation, it may be configured that one guest user can register another guest user. More specifically, after authentication of the first guest user himself/herself by means of his/her own fingerprint, just in the same manner as done by the main user according to the above exemplary embodiment, the first guest user registers the fingerprint data of the second guest user as a third authentication information. Moreover, it may be configured that guest users are registered hierarchically by, for example, allowing the second guest user to register the fingerprint data of the third guest user after authentication of the second guest user himself/herself by means of his/her own fingerprint. Even in such a case, however, the range of access authority granted to the newly registered guest user is in no case broader than the range of access authority granted to the introducer guest user.

(3-3) Variation 3

Authentication information employed as a judgment criterion when performing user authentication may be any biometrics information other than a fingerprint (e.g. venation pattern or iris) or any identification information stored in a contact-free IC card that is readable by the image display apparatus. In particular, the latter is quite convenient if a member of an entity such as a company is provided with an IC card. In either case, preferably, authentication information can be inputted into the image display apparatus 1 through a simple manipulation.

(3-4) Variation 4

According to an exemplary embodiment, a time period during which the fingerprint of the guest user is successfully scanned after scanning of the fingerprint of the main user is set at five seconds; however, the invention is not limited to such a specific embodiment. As it is preferable from the viewpoint of security that this time period should be as short as possible, it may be set as a short time period, for example, just one second. Or this time period may be set as a relatively long period, for example, 30 seconds, considering that there is a plurality of guest users.

(3-5) Variation 5

It is not necessary that the scanning of the guest user fingerprint be performed after the scanning of the main user fingerprint. That is, contrary to the processing order described in an exemplary embodiment, it may be configured that, firstly, the fingerprint of the guest user is scanned, and thereafter, the fingerprint of the main user is scanned.

If so configured, the CPU 11 directs the memory-type liquid crystal display medium 15 to display a message that prompts the guest user(s) to press his/her finger against the fingerprint sensor 25, and further prompts the main user to press his/her finger against the fingerprint sensor 25 within a predetermined period thereafter. In response to the message, the guest user presses his/her finger against the fingerprint sensor 25. The CPU 11 directs the fingerprint sensor 25 to scan this first fingerprint, and temporarily puts the scanned fingerprint data in the memory of the RAM 13. Then, the CPU 11 directs the timer 26 to start clocking at the time of scanning of the fingerprint data. Subsequently, as the main user presses his/her finger against the fingerprint sensor 25, the CPU 11 collates the scanned data with fingerprint data stored in the nonvolatile memory 23 if the fingerprint is successfully scanned within a predetermined time period after the start of clocking. If these fingerprints agree with each other, the CPU 11 stores, into the nonvolatile memory 23, the scanned fingerprint data that is temporarily put in the memory of the RAM 13, and updates the authentication table 231. That is, the CPU 11 assigns a new user ID to the guest user, and adds new line of records to the authentication table 231 which the new user ID is filled in. Then, the CPU 11 fills the user ID of the main user in the authentication table 231 as the introducer user ID. In addition thereto, the CPU 11 writes the fingerprint data storage address, the registration time and date, and the expiration time and date of the guest user in the authentication table 231. In this way, the guest user is registered.

As described above, it is sufficient to register, as the fingerprint data of the guest user (the second authentication information), any fingerprint data that is inputted during a predetermined time period before or after a point in time at which the fingerprint data of the main user (the first authentication information) is inputted.

(3-6) Variation 6

It may be configured that any apparatus other than the image display apparatus 1 performs processing pertaining to access control. For example, some embodiments may be implemented in a networked distributed information service system, which includes a server apparatus that is responsible for access control and a client apparatus that is responsible for information display (output). In such a configuration, when users operate the manipulation unit of the client apparatus so as to request for access to information, the client apparatus sends a query as to whether the access is allowed or not to the server apparatus.

In response to the query, the server apparatus judges as to whether the access request is approved or not. In such an implementation, an apparatus in which the access target information is stored may be the server apparatus or the client apparatus. In addition, the client apparatus is not limited to a fixed-type personal computer. That is, the client apparatus may be a mobile phone, a Personal Digital Assistance (PDA), or a similar device that is able to perform wireless data communications. Moreover, it is not necessary that the server apparatus be configured as a single standalone server apparatus. The server apparatus may be configured as a group of server apparatuses. For example, a server apparatus that serves functions related to user authentication and/or access approval/disapproval judgment as firewall, etc., may be separately configured from another server apparatus that serves a function of providing the access target information, where these separate servers cooperate with each other.

It should be noted that the meaning of the term "request for access to information" contains, in addition to the reading and displaying of information as described in an exemplary embodiment, various modes including, transfer/transmission of information, writing of information into a storage medium, outputting of information in an audio format, printing-out of information, and so forth.

(3-7) Variation 7

Although an access valid time period and an access approval range are designated for each guest user on the guest user registration window according to an exemplary embodiment described above, the CPU 11 may automatically set the access valid time period and the access approval range without accepting user-designation by a main user. For example, the access valid time period may be set uniformly to be one day, one hour, and so on. The access approval range may be set to be the same as that of the main user, or may be limited to the document that was displayed before the guest user registration window is displayed.

(3-8) Variation 8

The CPU 11 may keep a log of accesses by guest users as access history in the nonvolatile memory 23. Herein, the access history indicates a log that associates the user ID of the guest user who requested for access with the corresponding file name of the document to which the access is allowed. With such an access history, it is possible to trace the route of unauthorized leakage of a document if it happens. In addition, the existence of such a trace scheme acts as a deterrent against unauthorized leakage thereof.

(3-9) Variation 9

It should be noted that the invention is applicable to any apparatus that displays an image, for example, a personal computer. A program executed by the CPU 11 described above may be provided in a state stored in a storage medium, which includes, but not limited to, a magnetic tape, a magnetic disk, a floppy disk®, an optical recording medium, a magneto-optical medium, a Compact Disk (CD), a Digital Versatile Disk (DVD), and a RAM. That is, the invention may also be implemented as a program.

What is claimed is:

1. An access control apparatus comprising:
    a memory section that stores information;
    an authentication information memory section that stores at least one of first stored user authentication information and second stored user authentication information corresponding to a user, the first stored user authentication information including a predetermined access time period;
    an input section in which first inputted user authentication information and second input user authentication information are inputted;
    a judgment section that judges whether the first inputted user authentication information matches the first stored user authentication information;
    a registration section that stores the second inputted user authentication information in the authentication information memory section, if the judgment section judges that the first inputted user authentication information matches the first stored user authentication information;
    an approval section that approves access to the information stored in the memory section for the predetermined access time period if the judgment section judges that: (1) the first inputted user authentication information mates the first stored user authentication information, and (2) the second inputted user authentication information matches the second stored user authentication information; and
    an automated removal section that automatically removes the second stored user authentication information and the predetermined access time period form the authentication information memory section if a current period is later than the predetermined access time period;
    wherein the predetermined access time period is a time period specified in the first stored authentication information, and specifies a duration for allowing the user access to in the information stored in the memory section;
    the first stored user authentication information corresponds to a first user;
    the second stored user authentication information corresponds to a second user distinct from the first user; and
    the registration section causing each of a plurality of authentication information to get stored in authentication information memory section as the second authentication information if the plurality of the authentication information is inputted into the input section during the predetermined access time period before or after a point in time at which authentication information agreeing with the first stored user authentication information is inputted.

2. The access control apparatus according to claim 1, further comprising:
an access range memory section in which a range of information accessible by a user corresponding to the first authentication information is stored,
the registration section causing the second stored user authentication information to be stored in the authentication information memory section in association with the first stored user authentication information if the first inputted user authentication information matches the first stored authentication information stored in the authentication information memory section, and
the approval section approving access to the same range, or narrower, of information as that is accessible by the user corresponding to the first stored user authentication information with which the second stored user authentication information is associated if the second inputted authentication information matches the second stored user authentication information.

3. The access control apparatus according to claim 1, further comprising a designation section that designates a range of information that is accessible by a user corresponding to the first stored user authentication information, wherein
the registration section causing the second stored user authentication information to be stored in the authentication information memory section in association with the first authentication information if the first inputted user authentication information matches the first stored user authentication information stored in the authentication information memory section, and
the approval section approving access to information within a range designated by the user corresponding to the first stored user authentication information with which the second stored user authentication information matches the second authentication information.

4. The access control apparatus according to claim 1, the registration section causing each of a plurality of authentication information to be stored in the authentication information memory section as the second authentication information if the plurality of the authentication information is inputted into the input section during the predetermined access time period before or after a point in time at which authentication information agreeing with the first stored user authentication information is inputted.

5. The access control apparatus according to claim 1,
the registration section causing authentication information, which is inputted into the input section during the predetermined access time period before or after a point in time at which authentication information is inputted, to be stored in the authentication information memory section as a third inputted user authentication information if the authentication information inputted into the input section matches the second stored user authentication information, and
the approval section approving access to the information stored in the memory section only during the access valid time period if the authentication information inputted into the input section matches the third authentication information stored in the authentication information memory section.

6. The access control apparatus according to claim 1, the approval section including a history memory section that memorizes identification information of a user requesting access and access-approved information in association with each other when the approval section approves access to the information.

7. An image display apparatus comprising:
the access control apparatus according to claim 1; and
a display section that displays the information approved by the approval section.

8. A computer implemented program for directing a computer to implement functions, the computer having a memory section in which information is stored, an authentication information memory section in which at least a first authentication information corresponding to each user is stored, and an input section in which authentication information is inputted, the program directing the computer to implement functions comprising:
a judgment function of judging whether the authentication information inputted into the input section matches the first authentication information stored in the authentication information memory section;
a registration function of causing a second authentication information inputted into the input section during a predetermined access time period to be stored by the authentication information memory section, the predetermined access time period being before or after a point in time at which the authentication information is inputted, if the authentication information inputted into the input section matches the first authentication information stored in the authentication information memory section;
an approval function of approving access to the information stored in the memory section if the authentication information inputted into the input section matches the first authentication information stored in the authentication information memory section, and approving access to the information stored in the memory section only during a given access valid time period if the authentication information inputted into the input section matches the second authentication information stored in the authentication information memory section; and
an automated removal function that automatically removes the second authentication information and the stored predetermined access time period from the authentication information memory section if a current period is later than the predetermined access time period;
wherein the predetermined access time period is specified in the first authentication information, and specifies a duration for allowing the user access to the information stored in the memory section;
the first authentication information stored in the authentication information memory section corresponds to a first user;
the second authentication information stored in the authentication information memory section corresponds to a second user distinct from the first user; and
at least one of the judgment function, the registration function, the approval function and the automated removal function is performed by a hardware processor.

9. An access control apparatus comprising:
a memory section;
an input section that allows a user to input guest information and guest access expiration period, and first inputted user authentication information;

an authentication information memory section that stores the guest information and the guest access expiration period, and first stored user authentication information;

an automated removal section that automatically removes the stored guest information and the stored guest access expiration period from the authentication information memory section if a current period is later than the guest access expiration period;

an access section that allows a guest to access information if an inputted guest identity information matches the stored guest information; and a registration section that stores the guest information in the authentication information memory section, if the judgment section judges that the first inputted user authentication information matches the first stored user authentication information;

the guest access expiration period being a time period specified in the guest information, and specifying a duration for allowing the guest access to information stored in the memory section;

the user being distinct from the guest; and the registration section causing each of a plurality of authentication information to get stored in authentication information memory section as the second authentication information if the plurality of the authentication information is inputted into the input section during the predetermined access time period before or after a point in time at which authentication information agreeing with the first stored user authentication information is inputted.

10. The access control apparatus of claim 9, the input section further allowing the user to input guest access level information, the user having user access level information, the access section allowing the guest to only access information that has been designated at an information level at or below the guest access level information inputted by the user, and the user being unable to input guest access level information that is higher than the user access level information.

* * * * *